(12) United States Patent
Kriebel et al.

(10) Patent No.: US 8,342,402 B2
(45) Date of Patent: Jan. 1, 2013

(54) RFID ELECTRONIC LABEL

(75) Inventors: Frank Kriebel, Lichtenberg (DE); Carsten Nieland, Gotha (DE); Hannes Kullig, Johanngeorgenstadt (DE)

(73) Assignees: Smartrac Technology, Dresden; Dresden GmbH, Dresden ( * ) Notice: Subject to any disclaimer, the term of this patent is extended or adjusted under 35 U.S.C. 154(b) by 233 days.

(21) Appl. No.: 12/882,385

(22) Filed: Sep. 15, 2010

(65) Prior Publication Data

US 2011/0062236 A1 Mar. 17, 2011

(30) Foreign Application Priority Data

Sep. 15, 2009 (DE) .......................... 10 2009 041 323

(51) Int. Cl.
*G06K 7/08* (2006.01)
(52) U.S. Cl. ......................................................... 235/449
(58) Field of Classification Search ................... 235/449, 235/487, 492, 493
See application file for complete search history.

(56) References Cited

U.S. PATENT DOCUMENTS

| | | | |
|---|---|---|---|
| 5,912,622 A | 6/1999 | Endo et al. | |
| 6,371,380 B1 | 4/2002 | Tanimura | |
| 7,012,530 B2 | 3/2006 | Droz | |
| 7,053,854 B2 | 5/2006 | Plettner et al. | |
| 7,205,899 B2 | 4/2007 | Surkau | |
| 7,712,672 B2 * | 5/2010 | Takahashi et al. | 235/492 |
| 7,891,567 B2 * | 2/2011 | Burden et al. | 235/449 |
| 2001/0010333 A1 * | 8/2001 | Han et al. | 235/454 |

FOREIGN PATENT DOCUMENTS

| | | |
|---|---|---|
| DE | 103 43 188 | 12/2004 |
| DE | 10 2007 037293 | 2/2009 |
| JP | 2001 068916 | 3/2001 |

OTHER PUBLICATIONS

Mukherjee et al. ("Chipless RFID using stacked multilayer patches", Applied Electroniomagnetics Conference (AEMC), 2009, pp. 1-4).*

* cited by examiner

*Primary Examiner* — Seung Lee
(74) *Attorney, Agent, or Firm* — Tue Nguyen (57) ABSTRACT

A magnetic-guiding laminate is used to improve wireless communication between a transmitter and a receptor disposed on a substrate, regardless of the substrate materials. The laminate can comprise one or more layers of magnetic or non-magnetic material with different magnetic property. For example, the laminate can comprise a paramagnetic layer disposed on a diamagnetic layer, where the paramagnetic layer attracts the magnetic field toward the RFID antenna, and the diamagnetic layer prevents the magnetic field from dispersing in the substrate. Alternatively, the laminate can comprise multiple paramagnetic layers, wherein at least two layers have different magnetic properties, such as different permeability values.

24 Claims, 13 Drawing Sheets

RFID ELECTRONIC LABEL

This application claims priority from German Provisional Patent Application Serial no. 10 2009 041 323.5, filed on Sep. 15, 2009, entitled "RFID etikett"; which is incorporated herein by reference.

This invention relates to electronic labels, such as RFID (radio frequency identification) tags designed to be placed on objects with different surface characteristics.

BACKGROUND OF THE INVENTION

Electronic labels, such as radio frequency identification (RFID), can be used in non-contact type automatic identification technique. For example, an RFID tag is attached to an object and communicates with an RFID reader through transmission and reception of signals using a radio frequency in order to automatically identify the object using wireless radio waves.

There are different types of electronic labels, with different operating principles and/or functionalities, for example active and passive tags, tag reading only and tag read/write. Read only capability allows the identification of the object, for example, an inventory of objects in a warehouse, or identifications and locations of objects in an automatic manufacturing cycle. Read/write capability can be used in electronic card applications, such as smart card, which needs a read/write feature in order to modify the contents according to the consumption of the user.

The electronic label typically comprises an antenna and an electronic chip. The electronic chip provides the functionality, and the antenna provides the communication with a remote reader. The antenna can also produce the necessary energy to feed the electronic chip through the signal received from the reader. Such tags are intended to be applied to a very large number of objects, for example to shipping boxes, to the individual items in a store, or to credit cards or smart cards.

Figure 1A:
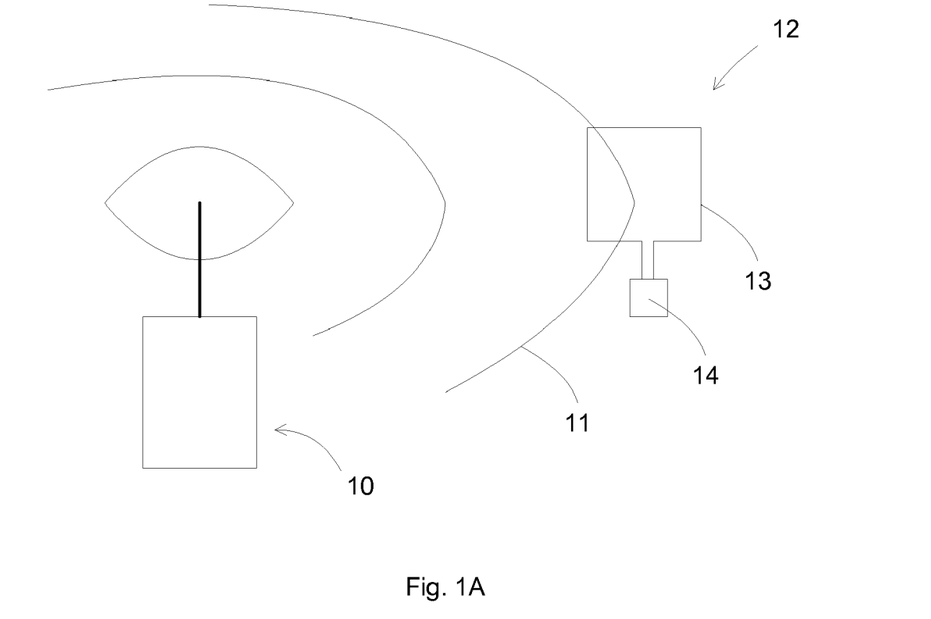
FIGS. 1A and 1B illustrate an exemplary configuration for communication between an RFID tag and an RFID reader.
Figure 1B:
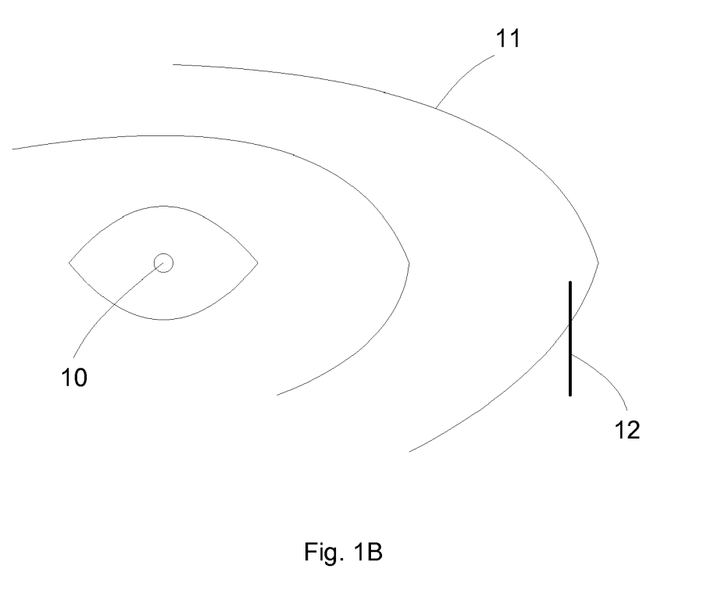

FIGS. 1A and 1B illustrate an exemplary configuration for communication between an RFID tag and an RFID reader. RFID reader 10 sends signal 11, such as electromagnetic waves, typically at radio frequency, but the waves can be at any desired frequency, either directional or non-directional toward RFID tag 12. The antenna 13 of RFID tag receives the signal 11 and processes the signal with the RFID chip 14. There are various modes of communication, for example, the RFID tag can be an active RFID tag, containing a battery acting as a partial or complete source of power for the tag's circuitry and antenna. The RFID tag can be a passive RFID tag, containing no battery and extracting power from the reader. The RFID tag can receive signals from the RFID reader, and return the signal, usually with some additional data related to the RFID tag. The RFID can actively send back a return signal, or can modulate the signal from the RFID reader so that the RFID reader can receive a modulated scatter return signal. For example, the input impedance of the tag antenna varies in response to the tag identification data, the magnetic field generated from the reader is modulatedly scattered. By receiving the scattered signal, the reader can read the tag identification data, for example, by demodulating the receiving scattered signal.

There is a requirement for the reading of an RFID tag: the tag antenna has to receive the signal sent from the RFID reader. For example, if the tag is too far, e.g., out of the range of the reader, then the reader cannot "see" the tag. Alternatively, if the tag is located in a dead spot, e.g., a location that the signal cannot reach, the tag is not responsive to the inquiry from the reader.

A potential dead spot for the magnetic field is the proximity of a conductive object, such as at a metal surface. When a magnetic flux encounters metals, eddy currents flow on the metal surface, generating a magnetic field that opposes the coming magnetic flux. The net effect is a shielding effect where the magnetic flux from the reader avoids the metallic surface, effectively staying away from the tag antenna.

Figure 2A:
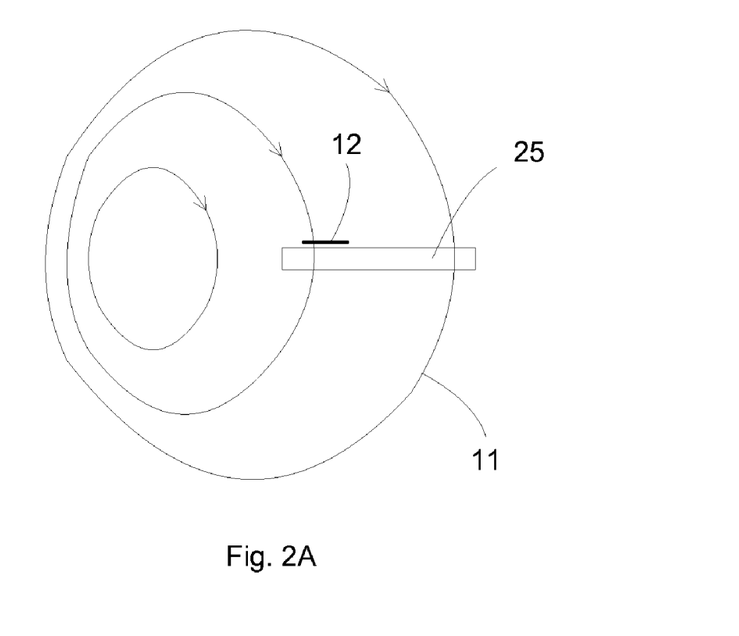
FIGS. 2A-2B illustrate the magnetic field encountering a tag disposed on surfaces of non-metal and metal materials.
Figure 2B:
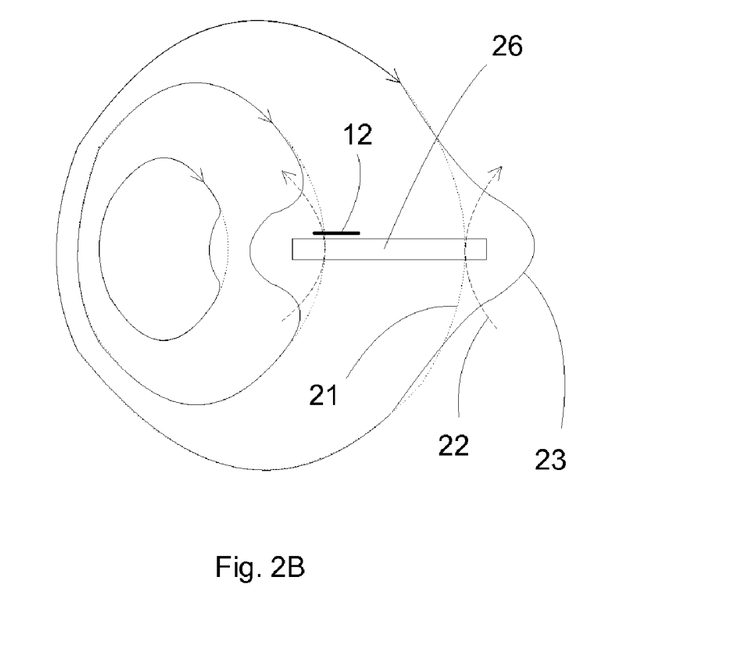

FIG. 2A illustrates a tag 12 disposed on a surface of a non-metal material 25. The magnetic field 11 can pass through the non-metal material 25, thus allowing the tag 12 to receive the signal from a reader. FIG. 2B illustrates a tag 12 disposed on a surface of a metal 26. The magnetic field 23 is bent around the metal 26, effectively preventing the tag 12 from receiving the signal. An explanation for the repelling of magnetic field near the metal surface can be as follows. Without the metal 26, the magnetic field lines can be as shown in 21. The magnetic field lines 21 pass through the metal, generating an eddy current on the metal surface. The eddy current then generates an opposing magnetic field 22. The combination of the original magnetic field 21 and the generated magnetic field 22 becomes the final magnetic field 23, which is repelled from the metal surface.

To prevent this loss of signals, the reader can be brought nearer the tag to restore the communication. Alternatively, the tag can be positioned farther from the metal surface, for example, by an insulating support layer. However, these solutions are often not practical.

Figure 3A:
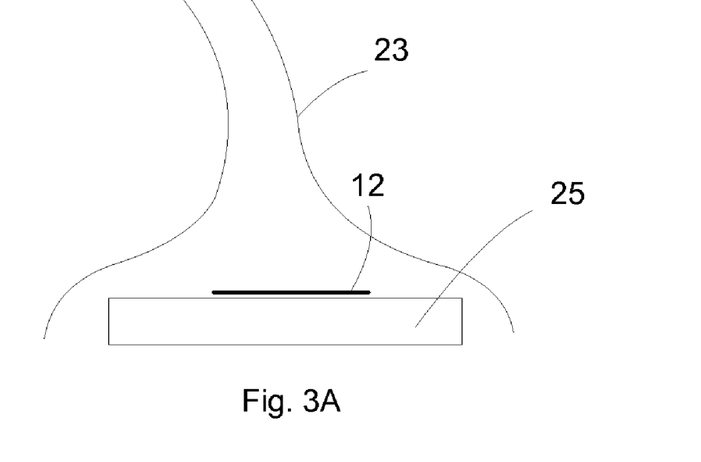
FIGS. 3A and 3B illustrate the effect of this highly permeable layer.
Figure 3B:
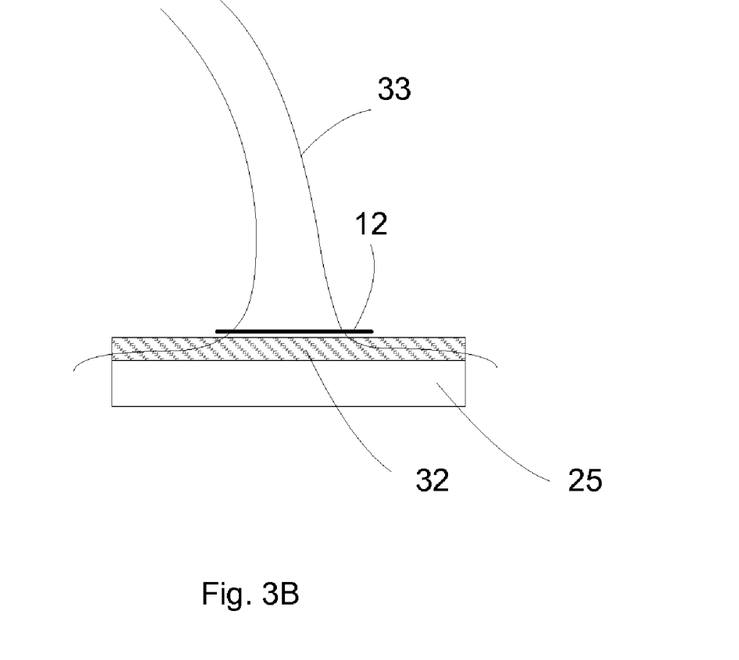

A potential prior art solution is the introduction of a high permeable material on the metal surface. This high permeable layer can reduce the eddy current to enable tag placement on a metal surface through the high permeable layer. FIGS. 3A and 3B illustrate the effect of this high permeable layer. In FIG. 3A, a tag 12 is placed on a metal surface 25. The magnetic field 23 is repelled from the metal 25, reducing or preventing the tag 12 from receiving the signal. In FIG. 3B, a high permeable layer 32 is placed on the metal surface 25 and the tag 12 is disposed on the high permeable layer 32. Since magnetic field can pass more easily through highly permeable material than through low permeable material, the magnetic field is modified, resulting in a magnetic field 33 that passes through the highly permeable layer 32. With the tag 12 disposed on the high permeable layer 32 and intercepting the magnetic field 33, the tag can now receive the signal. The highly permeable layer sometimes can be called magnetic absorbing material, since it absorbs magnetic field. In some literature, the highly permeable layer is called magnetic reflective material, since the magnetic field is reflected from the surface of substrate 25.

SUMMARY

In an embodiment, the present invention discloses systems and methods for effective wireless communication, regardless of the underlying substrates. In an aspect, the present invention relates to improved communication in RFID system, allowing an RFID reader to communicate with RFID tags, such as RFID transponder electronic labels In an embodiment, the present invention discloses a magnetic-guiding laminate to guide the magnetic field to the antenna of an RFID. The laminate can comprise one or more layers of magnetic or non-magnetic material.

In an embodiment, the present laminate comprises a diamagnetic layer, which can shield the incoming magnetic field (e.g., from an RFID reader) from the effects of the substrates. The laminate can comprise a paramagnetic layer disposed on a diamagnetic layer, where the paramagnetic layer attracts the magnetic field toward the RFID antenna, and the diamagnetic layer prevents the magnetic field from dispersing in the substrate.

In an embodiment, the multilayer laminates comprise multiple paramagnetic layers, wherein at least two layers have different magnetic properties, such as different permeability values. Other embodiments can be included.

DETAILED DESCRIPTION OF THE PREFERRED EMBODIMENTS

In an embodiment, the present invention discloses systems and methods for effective wireless communication, especially in the vicinity of conductive materials such as metallic objects. In an aspect, the present invention relates to improved communication between RFID tags, such as RFID transponder electronic labels, and RFID readers. The term label may also include a ticket. The present RFID tags can be applied on different surfaces of objects with different materials without affecting the functionality of the RFID tags. In an embodiment, the present RFID system has a small overall height, such as a thin label to be applied in or on card objects, such as smart cards or credit cards. In an embodiment, the RFID tag comprises an antenna coupled to an RFID chip. An RFID transponder electronic label comprises an RFID tag on a carrier or a substrate. The term RFID relates to radio frequency identification, but in the context of the present invention, comprises wireless communication, including all frequency transmission.

Wireless data communication between RFID transponder electronic label and the write/read devices occurs by means of electromagnetic waves. The propagation of such waves can be affected and disturbed by different materials, especially by conductive or metallic materials. To apply the RFID tags on objects having surfaces that affect the electromagnetic waves, such as a metallic surface that repels the electromagnetic waves, design considerations are often necessary, for example, to ensure adequate reception of signals, or to prevent placing the RFID tags on dead spots, e.g., locations devoid of electromagnetic waves.

In an embodiment, the present invention discloses a magnetic-guiding laminate to guide the magnetic field, for example, to the antenna of an RFID. The signal reception of an RFID tag or an RFID transponder electronic label can be consistent, regardless of the underlying material, e.g., adequate signal reception for the RFID antenna when the RFID tag is disposed on a dielectric or on a conducting surface such as a metal or magnetic material. The laminate can comprise one or more layers of magnetic or non-magnetic material.

The RFID tag or transponder electronic label comprises at least one electronic component and a generally flat antenna assembled on a generally planar substrate, to be read by a reader which transmits an electromagnetic field towards the RFID component. The magnetic-guiding laminate is disposed between the antenna and the substrate, guiding the electromagnetic field toward the antenna, and preventing the electromagnetic field from dispersing in the substrate or from repelling away from the RFID antenna.

In an embodiment, the magnetic-guiding laminate is in the form of a sheet at about the same size as the antenna. Alternatively, the laminate can be larger than the antenna, creating an edge effect to improve the signal reception for the antenna. In other embodiments, the laminate can be smaller than the antenna, designed to optimize the signal reception on various substrates. The laminate can be directly placed under the antenna or with an intermediate layer such as an insulating layer.

The RFID transponder electronic label can be embedded in a resin or encapsulated between two protection sheets. Additional layers can be used, such as printed label or adhesive layer. In an embodiment, the laminate comprises a magnetic material in the form of a sheet. Alternatively, other forms can be used, such as magnetic particles embedded in a plastic sheet.

In an embodiment, the present laminate addresses the requirement of the overall height of the RFID transponder electronic label, which is less than a few mm, and preferably less than 1 mm. In an embodiment, the present laminate employs low permeable material, and still provides necessary signal reception for an RFID antenna disposed on a metallic surface.

In an embodiment, the present laminate comprises at least 2 layers having different magnetic properties, which are then disposed between the RFID transponder and the substrate surface. For example, the RFID antenna of an RFID tag is applied on a first layer with a first magnetic property which is disposed on a second layer with a second magnetic property, where the first and second magnetic properties are different from each other. The RFID tag on the layers is then applied on the surface of the object. Additional layers, for example another magnetic layer, non-magnetic layer, insulating layer, encapsulating layer, or self adhesive layers, can be included. For example, an insulating layer can be placed between the antenna and the top layer of the laminate, between the layers of the multilayer laminate, or between the bottom layer of the laminate and the substrate. Additionally or alternatively, an adhesive layer can be placed between these components (antenna, layers of the laminate, and substrate) to bond these components together.

In an embodiment, the different layers of the laminate can have at least one different geometrical dimension, such as different size, length, width, shape, or thickness. For example, the upper magnetic layer can be smaller or thicker than the lower magnetic layer. The magnetic layer can be a solid sheet or can have one or more splits. For example, the layer can have split patterns in the layer. The surface of the magnetic layers can be structured to have patterns, for example, by a mechanical process such as coining, imprinting or shaping. The individual layer can also be formed of multiple layers, pressed together to achieve a desired magnetic property. The individual layer can be in the form of foil material.

In an embodiment, the magnetic layer can be a magnetic film. Alternatively, the magnetic layer can be a support layer with embedded magnetic particles. The magnetic layer can comprise a paste layer, such as an organic, inorganic, or a mixture of organic and inorganic paste, with embedded magnetic particles.

In an embodiment, the present invention discloses a magnetic repelling material, such as a diamagnetic layer, which is disposed between an antenna and an object surface to improve signal reception for the antenna. In an embodiment, the present laminate comprises a magnetic absorbing layer disposed on a magnetic repelling layer, such as a paramagnetic layer on a diamagnetic layer.

The laminate can improve signal reception on conducting object, and can provide similar signal reception for different materials. Also, the thickness of the laminate (all layers including antenna and magnetic layers) can be small, less than 0.5 mm, or less than 0.3 mm. The paramagnetic layer can be between 0.05-0.2 mm, or can be less than 0.3 mm, and the diamagnetic layer can be less than 0.1 mm or can be less than 0.2 mm. In addition, the permeability of the paramagnetic layer should be between $10<\mu<60$ and permeability of the diamagnetic layer should be less than $1\mu$.

In electromagnetism, permeability $\mu$ of a material is its ability to support the formation of a magnetic field. In general, permeability $\mu$ and relative permeability $\mu_r$, which is the ratio to vacuum permeability $\mu_0$, are used interchangeably. One could say that permeability is the measure of the conductance of magnetic field within a material. For example, a material with higher permeability is much more attractive to the magnetic field than one with lower permeability. Thus the magnetic materials with $\mu>1$ can be called magnetic absorbing materials and the magnetic materials with $\mu<1$ can be called magnetic repelling materials. In addition, metals or conducting materials with eddy current can also be called magnetic repelling materials, since the generation of eddy current creates opposing magnetic field, which opposes the incoming magnetic field, and results in a final magnetic field that is repelled from the object's surface.

Figure 4A:
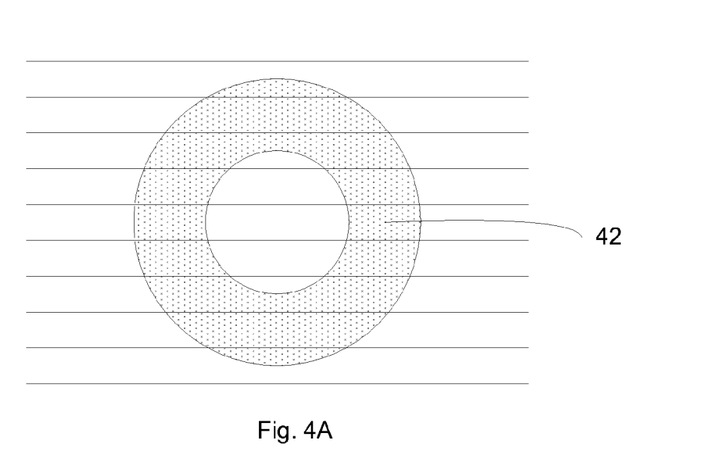
FIGS. 4A-4C illustrate a schematic effect of permeability on the magnetic field in a paramagnetic material.
Figure 4B:
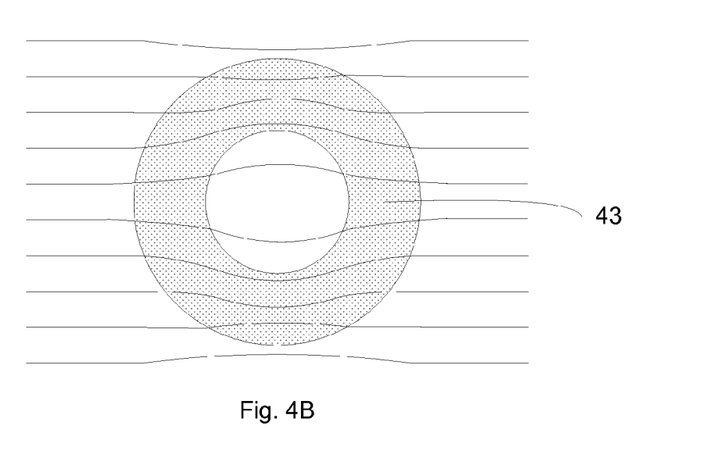
Figure 4C:
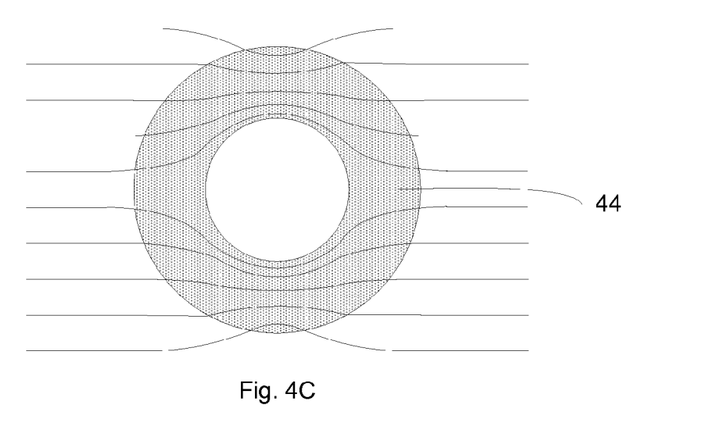

FIGS. 4A-4C illustrate a schematic effect of permeability on the magnetic field in a paramagnetic material. FIG. 4A shows a paramagnetic ring 42 having low permeability, such as ~1 (a little more than 1), which is about the same as the surrounding vacuum ambient. There is no effect on the magnetic field, e.g., the magnetic field passes through the ring as though it is not there. FIG. 4B shows a ring 43 having medium permeability, such as 3-7. The magnetic field prefers to pass through the ring 43. However, the medium permeability is not attractive enough, thus does not capture all the magnetic field lines. Some still escape, preferring the difficult shorter distance in the middle of the ring to the easy longer distance within the ring. FIG. 4C shows a ring 44 having high permeability, such as 10-30. The high permeability is very attractive to the magnetic field, and thus all field lines bend around to be within the high permeability ring, effectively shielding the inner portion of the ring 44. The term paramagnetic material is used in the context of the present description as material with permeability higher than that of vacuum, e.g., $\mu>\mu_0$, or $\mu_r>1$, including materials not retaining magnetic field after being exposed and removed from an external magnetic field, and materials retaining magnetic field (such as ferro and ferri materials).

This illustrates the effect of the use a magnetic absorbing layer, e.g., a paramagnetic layer. The permeability would need to be high enough to ensure that all magnetic lines enter the magnetic material, since any escaped magnetic field would generate a surface eddy current, which can alter the magnetic field in an undesirable way.

Figure 5A:
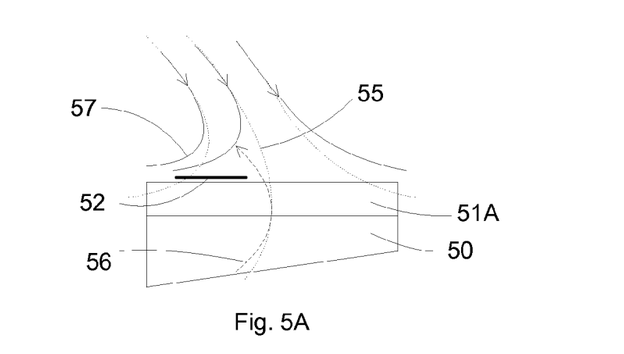
FIGS. 5A-5D illustrate the effect of magnetic layer with required permeability or thickness.

FIGS. 5A-5D illustrate the effect of magnetic layer with required permeability or thickness. FIG. 5A illustrates an effect of the magnetic layer 51A with inadequate permeability and inadequate thickness. As shown, an RFID tag 52 is disposed on a magnetic layer 51A on a metallic substrate 50. Many of the original magnetic field 55 (e.g., the magnetic field without the metallic substrate 50) enter the magnetic layer 51A due to the high permeability (e.g., higher than that of the surrounding environment). However, since the permeability and the thickness of the magnetic layer 51A are not adequate (e.g., not high enough permeability and thickness not high enough), some magnetic field lines escape the magnetic layer 51A and enter the metallic substrate 50. This magnetic field generates surface eddy current, which sets up a magnetic field 56 opposing the coming magnetic field 55. The net result can be the magnetic field 57, which stays away from the metallic substrate 50 as well as the magnetic layer 51A. The RFID tag, in this case, can perform poorly due to poor signal reception.

Figure 5B:
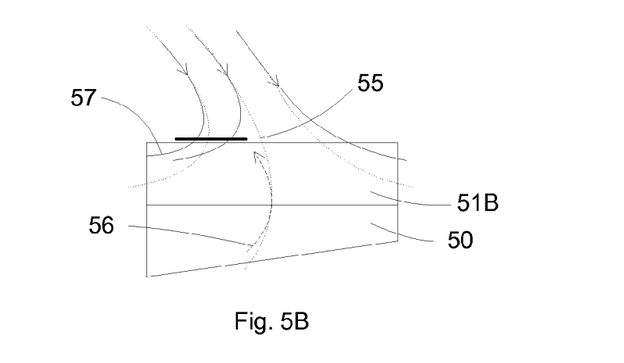

FIG. 5B illustrates a similar configuration with a thicker magnetic layer 51B. For this thickness, the resulting magnetic field 57 also bends away from the metallic substrate 50, but still stays within the magnetic layer 51B. Thus the RFID reception can be acceptable, even with the generated surface eddy current and the opposing magnetic field 56.

Figure 5C:
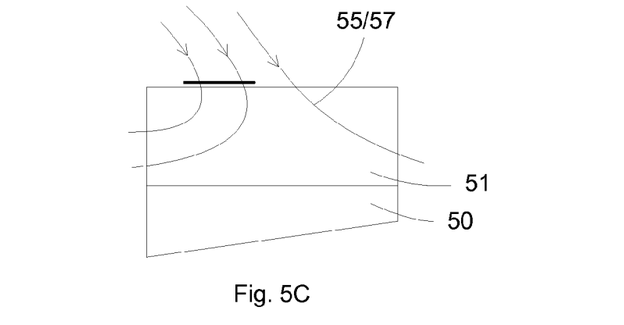

FIG. 5C illustrates a similar configuration with an even thicker magnetic layer 51C. For this thickness, all magnetic field are captured in the magnetic layer 51C, thus there is no eddy current or opposing magnetic field. The original magnetic field 55 and the resulting magnetic field 57 are identical in this case.

Figure 5D:
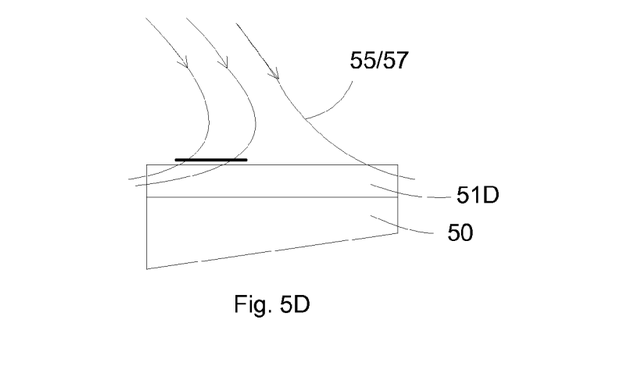

FIG. 5D illustrates a similar configurations with a magnetic layer 51D having higher permeability. For this high permeability, all magnetic field are captured in the magnetic layer 51D, thus there is no eddy current or opposing magnetic field. The original magnetic field 55 and the resulting magnetic field 57 are identical.

Thus one of the requirements for a magnetic layer disposed between an RFID antenna and a metallic surface is adequate permeability or adequate thickness. High permeability magnetic materials can be costly. And high thickness magnetic layers might not satisfy the requirements of form factor, for example, thin form factor in smart card or credit card applications or smart label.

The present invention recognizes the above potential limitations of a magnetic absorbing layer, e.g., a magnetic layer having permeability greater than that of vacuum. Thus in an embodiment, the present invention discloses a magnetic repulsive layer, e.g., a diamagnetic material or a magnetic layer having permeability less than that of vacuum. In another embodiment, the present invention discloses a multilayer laminate, e.g., multiple layers of different magnetic properties. The diamagnetic layer or the multilayer laminate can shape the magnetic field toward the RFID antenna, providing minimum disturbance in the presence of a conducting substrate.

In an embodiment, the present invention discloses a diamagnetic layer, which can be disposed between an RFID antenna of an RFID tag and a conductor (e.g., metallic) substrate. Diamagnetic materials are materials having relative permeability less than 1 ($\mu_r < 1$), which create a magnetic field in opposition to an externally applied magnetic field, resulting in a repulsive effect.

In the presence of an external magnetic field, the orbital velocity of electrons around their nuclei in the diamagnetic materials can be altered, thus changing the dipole moment in the direction opposing the external field. Alternatively, movements of electrons in the diamagnetic materials can generate the opposing magnetic field. The net result is that the diamagnetic materials can behave similar to the metallic substrates, repulsing the external magnetic field.

In general, diamagnetic materials are considered as "non-magnetic" materials, including water, wood, most organic compounds such as some plastics, and many metals. Typical diamagnetic materials include bismuth, carbon, copper, lead, mercury, silver, water, gold, superconductor, their alloys or any combinations thereof.

Figure 6A:
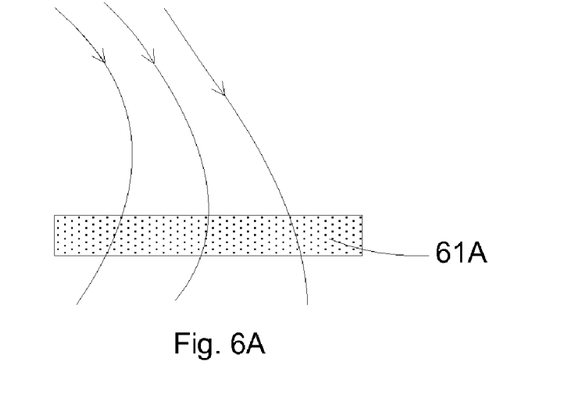
FIGS. 6A-6C illustrate a schematic effect of permeability on the magnetic field in a diamagnetic material.
Figure 6B:
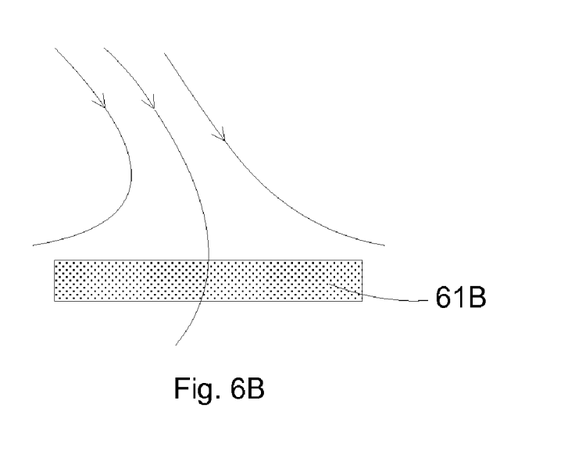
Figure 6C:
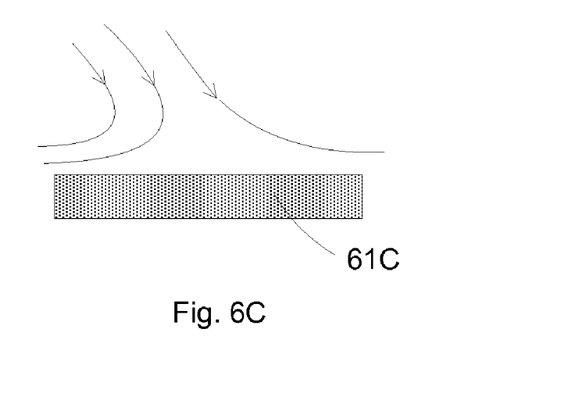

FIGS. 6A-6C illustrate a schematic effect of permeability on the magnetic field in a diamagnetic material. FIG. 6A shows a diamagnetic layer 61A having low diamagnetic effect with permeability ~1 (a little less than 1), which is similar to the surrounding vacuum ambient. There is minimum effect on the magnetic field, e.g., the magnetic field passes through the layer with un-noticeable effect. FIG. 6B shows a diamagnetic layer 61B having medium diamagnetic effect. The magnetic field repels around to avoid the layer 61B. However, the medium diamagnetic effect is not repulsive enough, thus does not repel all the magnetic field lines. Some still enter the diamagnetic layer 61B, preferring the difficult shorter distance in the middle of the layer than to the easy longer distance around the layer. FIG. 6C shows a layer 61C having strong diamagnetic effect, such as permeability close to zero, for example superconducting materials. The zero permeability is very repulsive to the magnetic field, and thus all field lines bend around to avoid the superconducting layer 61C. The above description, as well as other descriptions in the specification, is intended to serve as illustration, and thus is not intended to have the degree of technical accuracy of scientific journals.

In an embodiment, the present invention discloses using a magnetic repelling material, such as diamagnetic material to control the magnetic field, especially at the surface of a conducting substrate. Other types of magnetic repelling material include various metals, which generate eddy current to repel the magnetic field at the surface. The properties of the diamagnetic material can be designed to minimize the effect of the conducting substrate, such as eliminating the magnetic field entering the conducting substrate to prevent surface eddy current. For example, the thickness and the permeability of the diamagnetic layer can be selected to maximize the reception of magnetic field by an RFID antenna.

In an embodiment, the present invention discloses a multiple laminate having a diamagnetic layer. Other layers of paramagnetic property (high permeability, low permeability, or even non-magnetic material) can be used to guide the magnetic field toward the RFID antenna, enhance the signal reception.

The paramagnetic layer bundles the electromagnetic waves arriving from the RFID reader and concentrates these within the surface range of the RFID antenna of the RFID transponder. The thickness of the paramagnetic layer can be less than 1 mm, less than 0.5 mm, less than 0.3 mm, or less than 0.2 mm. With the thin paramagnetic layer, some magnetic field can escape the paramagnetic layer to face the diamagnetic layer. The diamagnetic layer then causes a dispersion of the electromagnetic waves and thus a field displacement, effectively preventing the wave from entering the metallic substrate. The thickness and permeability of the diamagnetic layer can be controlled to repel the field from the metallic surface at a minimum distance, e.g. preventing the field from entering the metallic substrate with minimum disturbance to other field lines. The diamagnetic layer is designed to optimize the signal reception at the antenna, in contrast to the uncontrollable metallic effect that repels magnetic field away from the antenna, depending on the material characteristics.

Advantages of the diamagnetic layer include thin layer and medium permeability (e.g., permeability closer to vacuum than to superconductor). Only minimum magnetic repelling is needed to prevent surface eddy current without significantly disturbing the other magnetic field lines, thus thin diamagnetic layer or medium permeability can be adequate. Another advantage is the controllability of the magnetic repelling characteristics, typically at a minimum distance from the object's surface.

Figure 7A:
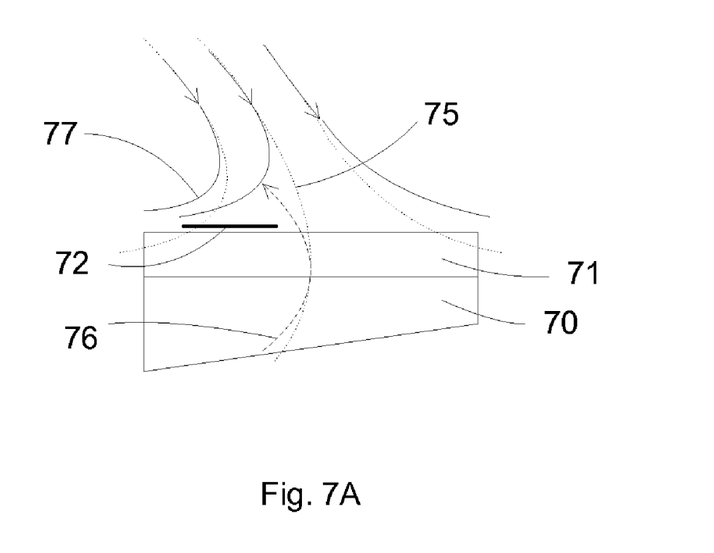
FIGS. 7A-7B illustrate an effect of the present diamagnetic layer on enhancing signal reception.
Figure 7B:
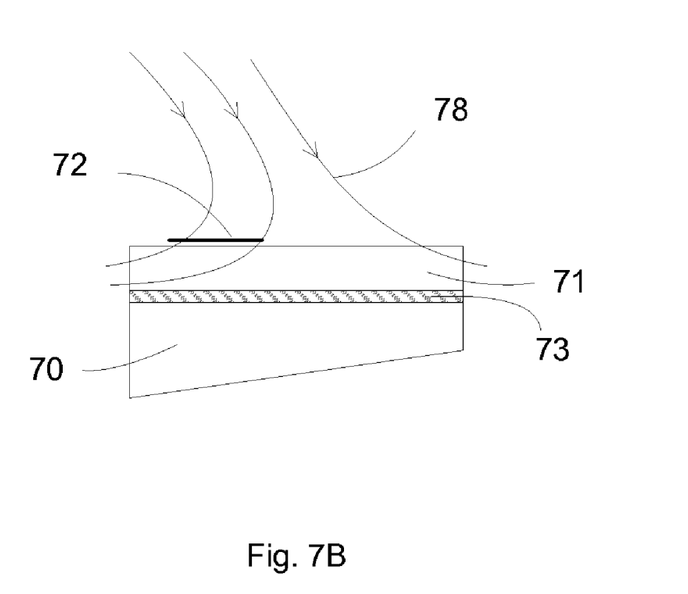

FIGS. 7A-7B illustrate an effect of the present diamagnetic layer on enhancing signal reception. FIG. 7A illustrates an RFID tag 72 disposed on a paramagnetic layer 71 on a metallic substrate 70. With high permeability, the magnetic field 75 curves at the surface of the metallic substrate 70 to enter the paramagnetic layer 71. However, for paramagnetic layer 71 with low thickness or not high enough permeability, some magnetic field 75 can escape and enter the metallic substrate, generating a surface eddy current and opposing magnetic field 76. The resulting magnetic field 77 is repelled from the metallic substrate 70, reducing the signal reception of the RFID tag 72.

FIG. 7B illustrates the same RFID tag 72 with the paramagnetic layer 71 and the metallic substrate 70, having a diamagnetic layer 73 disposed between the paramagnetic layer 71 and the substrate surface 70. The diamagnetic layer 73 repels the magnetic field that escapes the paramagnetic layer 71, preventing the generation of eddy current and the formation of opposing field. Thus the resulting magnetic field can be minimally disturbed, improving the signal reception for the RFID tag 72.

In an embodiment, the present invention discloses multilayer laminates, comprising multiple layers with different magnetic properties. The multilayer laminates can improve the signal reception for an RFID antenna disposed on a conducting substrate, or to maintain adequate signal reception when adhering to surfaces of different substrates. The multilayer laminates are designed to optimize magnetic field to the RFID antenna, minimizing magnetic field entering the conducting substrate to prevent eddy current and generating an opposing magnetic field, and/or preventing a repelling effect due to conducting substrate.

In an embodiment, the multilayer laminates comprise a diamagnetic layer, which can shield the effect of the substrate with respect to an externally applied magnetic field. For example, the present multilayer laminates comprise a paramagnetic layer or a non-magnetic layer disposed on a diamagnetic layer. Additional layers can also be included.

In an embodiment, the multilayer laminates comprise multiple paramagnetic layers, wherein at least two layers have different magnetic properties, such as different permeability values. For example, the present multilayer laminates comprise a lower permeability paramagnetic layer disposed on a higher permeability magnetic layer. The multiple magnetic layers can shape the magnetic field to optimize signal reception, and to minimize substrate effects. More than two layers can be included.

Figures 8A, 8B:
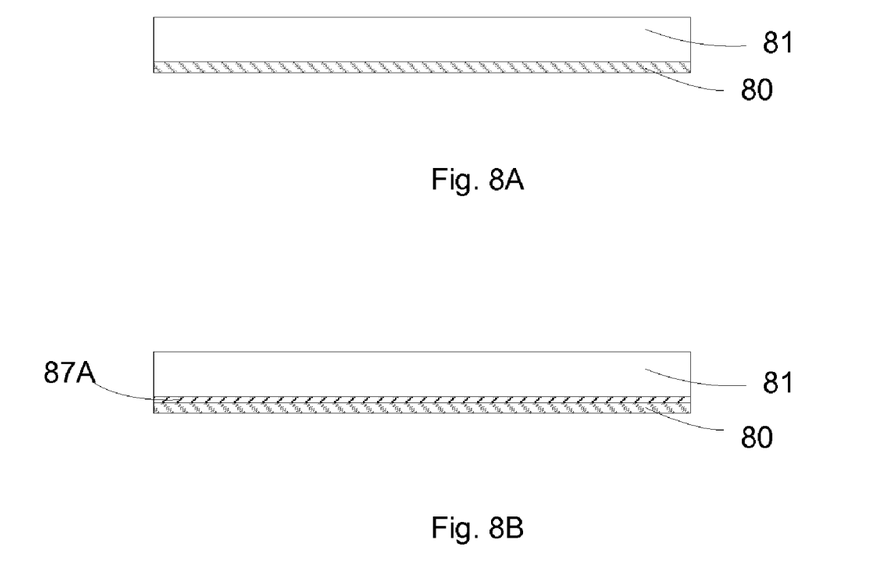
FIGS. 8A-8D illustrate exemplary multilayer magnetic laminates.
Figure 8C:
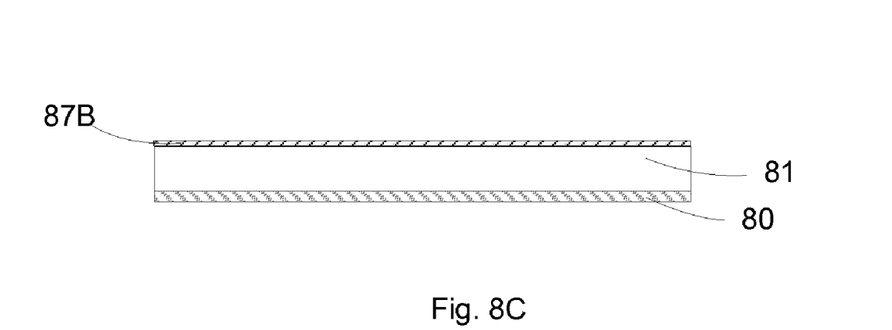
Figure 8D:
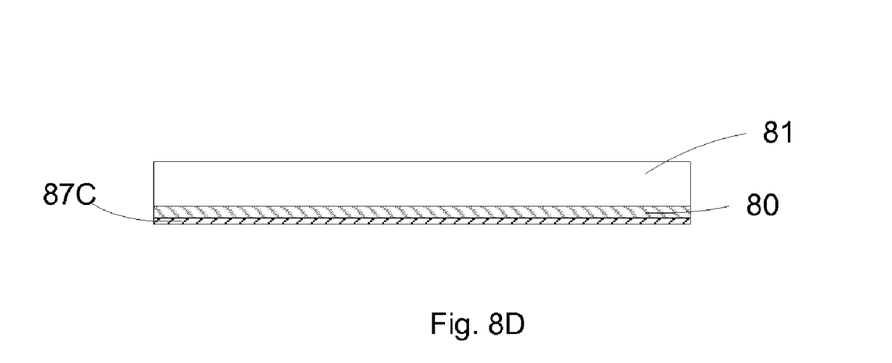

In an embodiment, the present invention discloses multilayer magnetic laminates, to be used to improve signal reception to an antenna or to minimize substrate effects on the signal reception of an antenna. FIGS. 8A-8D illustrate various configurations of the multilayer laminate according to an embodiment of the present invention. FIG. 8A illustrates an exemplary multilayer magnetic laminate, comprising a first layer 81 disposed on a second layer 80 wherein the first and second layers have different magnetic properties. For example, the first layer can be a paramagnetic or ferromagnetic layer ($\mu_r$>1) and the second layer can be a diamagnetic layer ($\mu_r$<1). Alternatively, the first layer can be a paramagnetic layer ($\mu_r$>1) and the second layer can be a magnetic repelling layer such as an eddy generating conducting layer. One of the magnetic layers can be the carrier substrate, for example, when the carrier substrate exhibits or can be modified to exhibit magnetic characteristics suitable for one magnetic layer of the multilayer laminate. FIG. 8B adds an additional layer 87A, such as an adhesive layer or an isolation layer between the layers 80/81 of the multilayer laminate. FIG. 8C adds an additional layer 87B, such as an encapsulating layer on top of the multilayer laminate. FIG. 8D adds an additional layer 87C, such as an isolation or insulation layer, or an adhesive at the bottom of the multilayer laminate. Multiple additional layers, such as multiple layers 87A, 87B, 87C, and 87D can also be included.

Figure 9A:
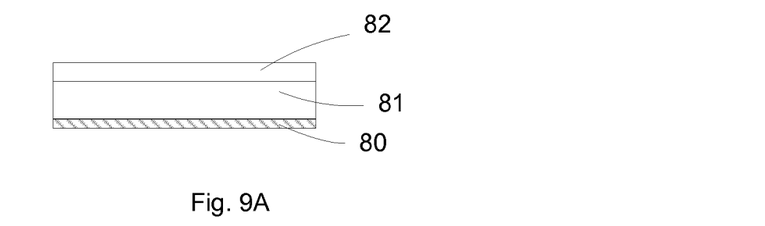
FIGS. 9A-9E illustrate exemplary antenna systems.
Figure 9B:
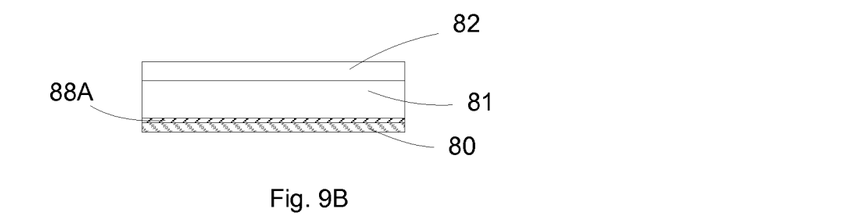
Figure 9C:
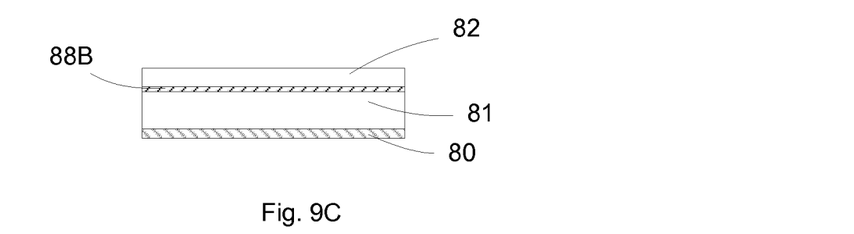
Figure 9D:
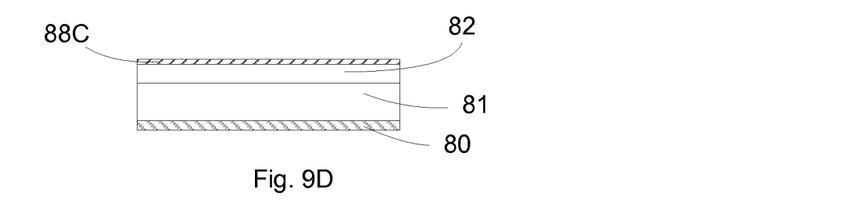
Figure 9E:
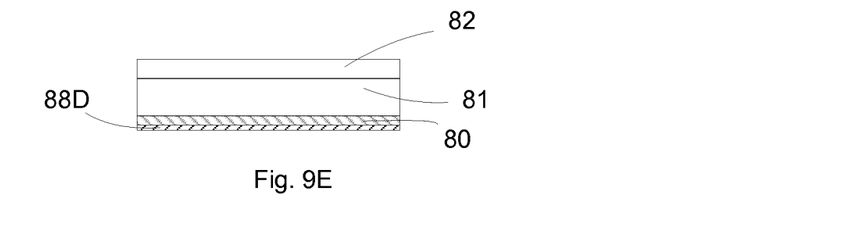

In an embodiment, the present invention discloses an antenna system, comprising an antenna disposed on a multilayer magnetic laminate, which can allow the antenna to be placed on various substrates without significant degradation of signal reception. For example, the present antenna system can be placed on metallic surface without or with minimum surface eddy current generation which can alter the incoming magnetic field. The antenna system can be an RFID tag, which further comprises an RFID chip in addition to the antenna. The present antenna system can be used in other wireless communication systems. FIGS. 9A-9E illustrate various configurations of the antenna system according to an embodiment of the present invention. FIG. 9A illustrates an exemplary antenna system, comprising an antenna 82 disposed on a first layer 81 disposed on a second layer 80 wherein the first and second layers have different magnetic properties. In an embodiment, the present invention discloses a wireless communication system, comprising a wireless circuit disposed on a multilayer magnetic laminate on a metallic (e.g., conducting) object. FIG. 9B adds an additional layer 88A, such as an adhesive layer or an isolation layer between the layers 80/81 of the multilayer laminate. FIG. 9C adds an additional layer 88B, such as an adhesive layer or an isolation layer between the antenna 82 and the multilayer laminate 81/80. FIG. 9D adds an additional layer 88C, such as an encapsulating layer on top of the antenna. FIG. 9E adds an additional layer 88D, such as an isolation or insulation layer, or an adhesive at the bottom of the multilayer laminate. Multiple additional layers can also be included.

Figure 10A:
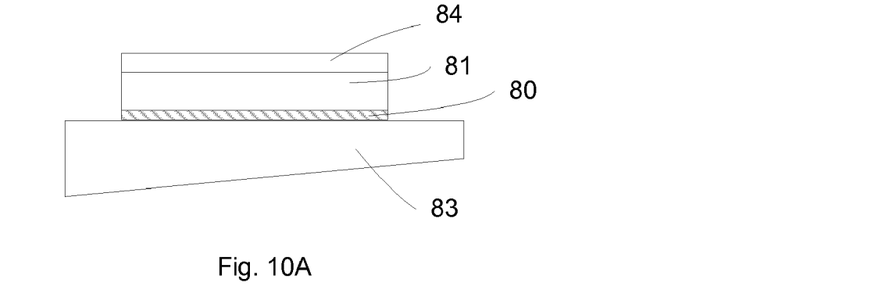
FIGS. 10A-10D illustrate exemplary wireless communication systems.
Figure 10B:
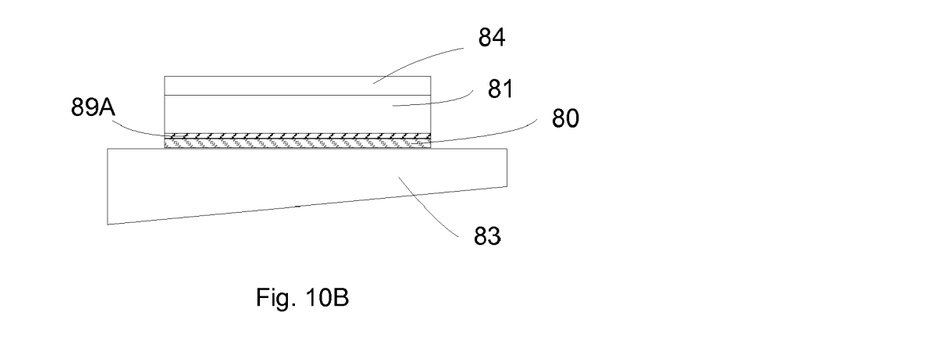
Figure 10C:
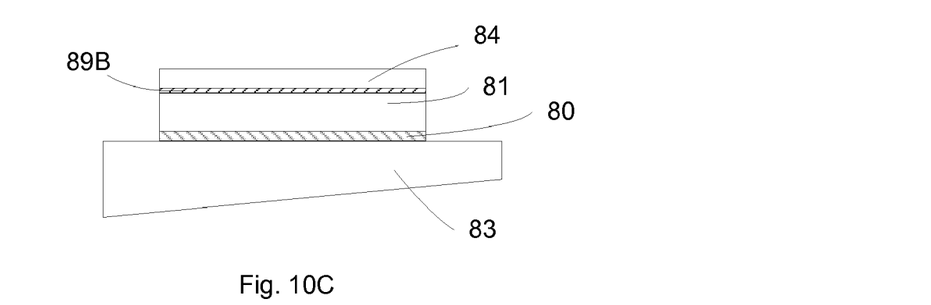
Figure 10D:
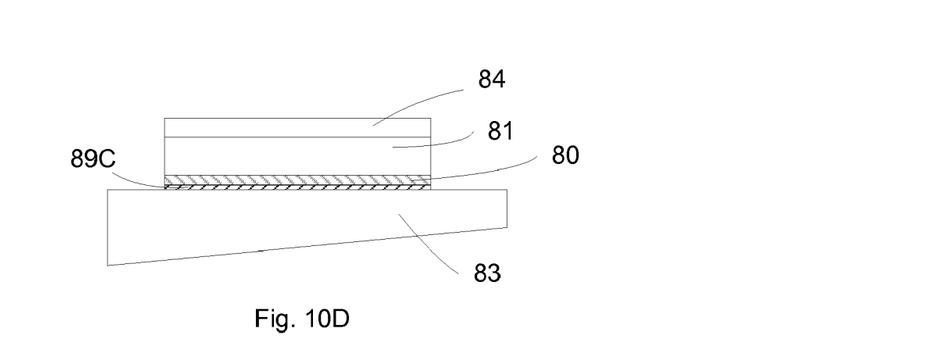

FIGS. 10A-10D illustrate various configurations of the wireless communication systems according to an embodiment of the present invention. FIG. 10A illustrates an exemplary wireless communication system, comprising a circuit having an antenna 84 disposed on a multilayer (80/81) placed on a substrate 83 wherein the multilayer has multiple layers with different magnetic property. FIG. 10B adds an additional layer 89A, such as an adhesive layer or an isolation layer between the layers 80/81 of the multilayer laminate. FIG. 10C adds an additional layer 89B, such as an adhesive layer or an isolation layer between the antenna 84 and the multilayer laminate 81/80. FIG. 9D adds an additional layer 89C, such as an isolation or insulation layer, or an adhesive at the bottom of the multilayer laminate. Multiple additional layers can also be included.

Alternatively, if the carrier substrate exhibits a desired magnetic characteristic, or can be modified to exhibit the desired magnetic characteristic, it can replace one of the magnetic layers in the multilayer laminate.

Figure 11:
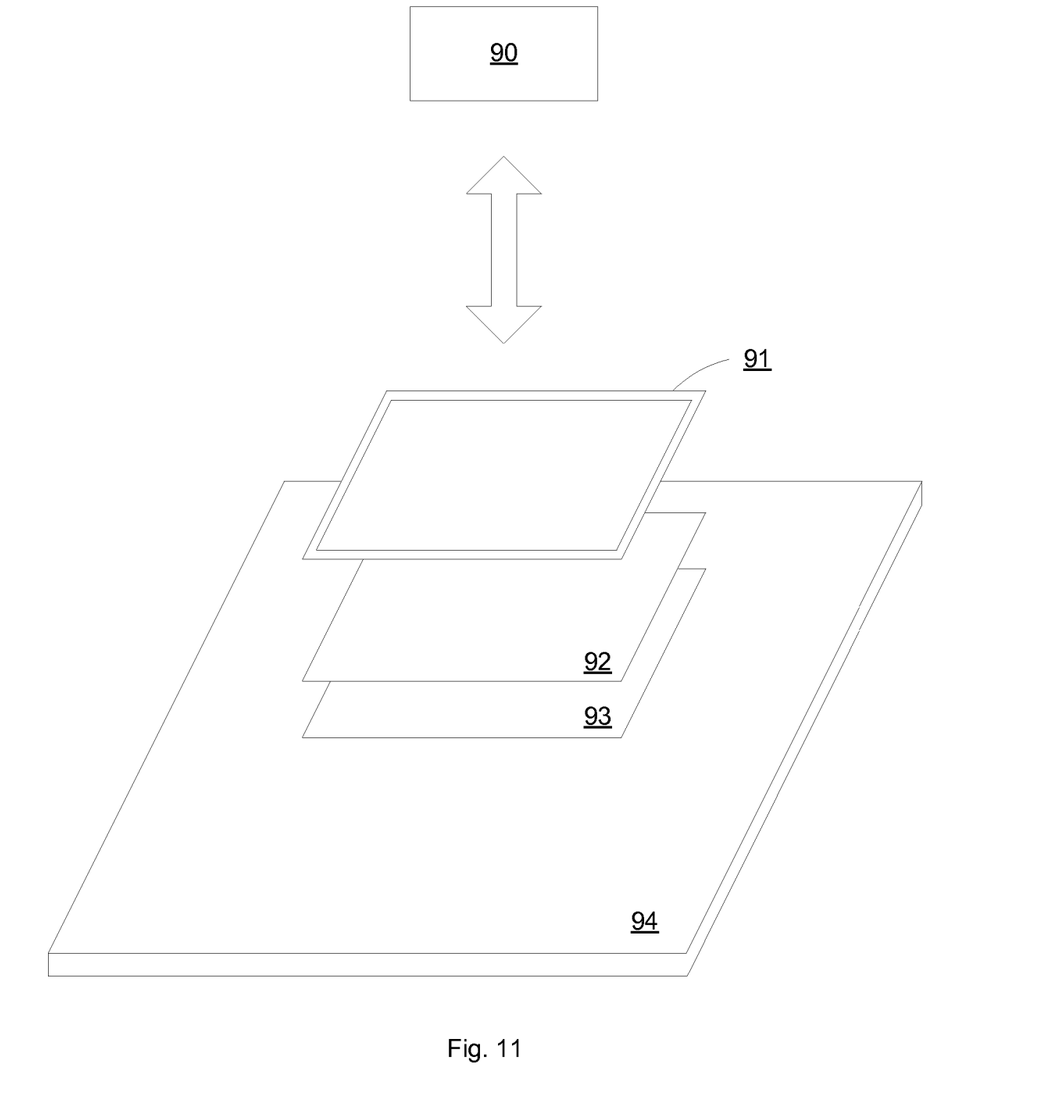
FIG. 11 illustrates an exemplary configuration for RFID system.

FIG. 11 illustrates an exemplary configuration for RFID system according to an embodiment of the present invention. An RFID tag comprising an RFID antenna 91 is disposed on a first magnetic layer 92, which is disposed on a second magnetic layer 93. The magnetic layers can have similar size and shape as the antenna. Alternately, the magnetic layers can be larger or smaller, designed with the objective of optimizing signal reception to the RFID antenna. The whole system is then placed on the surface of an object 94. The magnetic layers 92/93 can effectively shield the coming magnetic field, for example the signal generated from a reader 90, from the adverse effects due to the object, such as the generation of eddy current or opposing magnetic field. Thus the present RFID system can be placed on virtually any objects, (metallic or non-metallic) without concern for loss of signal reception. Additional adhesive layers can be placed on the RFID antenna and/or on the magnetic layers.

In an embodiment, the present invention discloses methods to prepare a multilayer laminate and use the multilayer laminate to improve signal reception for a wireless system.

Figure 12A:
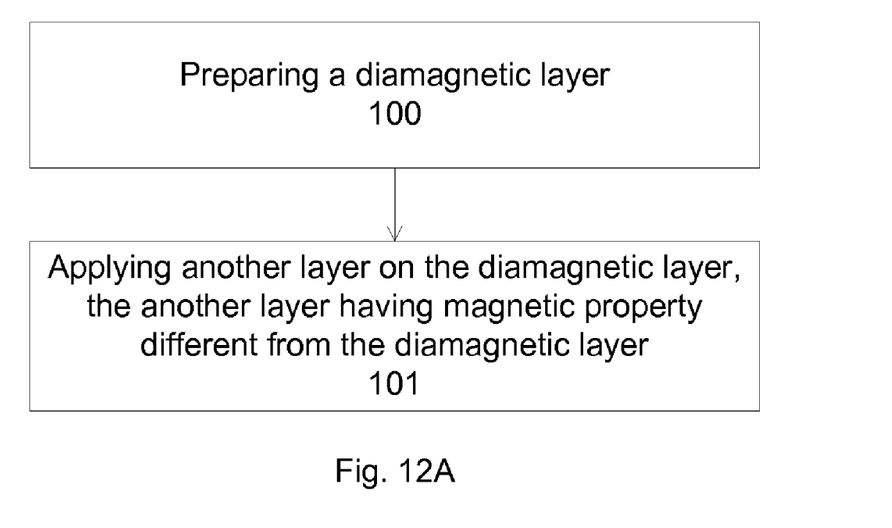
FIGS. 12A-12B illustrate methods to prepare a multilayer laminate.

FIG. 12A illustrates a method to prepare a multilayer laminate. In operation 100, a diamagnetic layer is prepared. The diamagnetic material can be any material with permeability less than 1. The thickness of the diamagnetic layer can be less than 1 mm, less than 0.8 or less than 0.3 mm. In operation 101, another layer is applied on the diamagnetic layer to form the multilayer laminate. The other layer has magnetic property different from the diamagnetic layer. In an embodiment, the other layer is a paramagnetic layer, having permeability greater than 1. The thickness of the paramagnetic layer can be less than 1 mm, less than 0.8 or less than 0.3 mm.

Figure 12B:
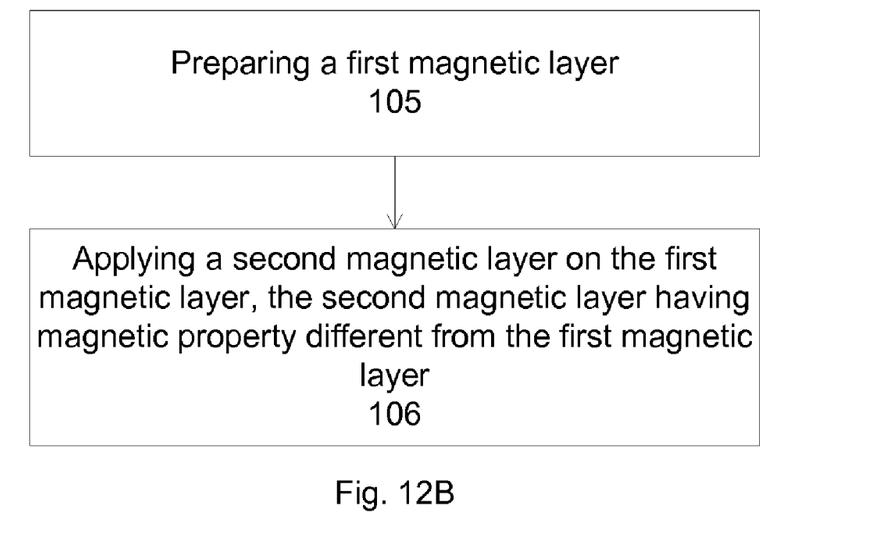

FIG. 12B illustrates another method to prepare a multilayer laminate. In operation 105, a first magnetic layer is prepared. The first magnetic material can be any material with permeability greater than 1. In operation 106, a second magnetic layer is applied on the first magnetic layer to form the multilayer laminate. The other layer has magnetic property different from the diamagnetic layer. In an embodiment, the second layer has permeability less than that of the first magnetic layer.

Additional layers can be used, on top, in between, and/or at bottom of the multilayer laminate. The additional layers can be adhesive layers, insulating layers, encapsulating layers, or other magnetic layers.

Figure 13A:
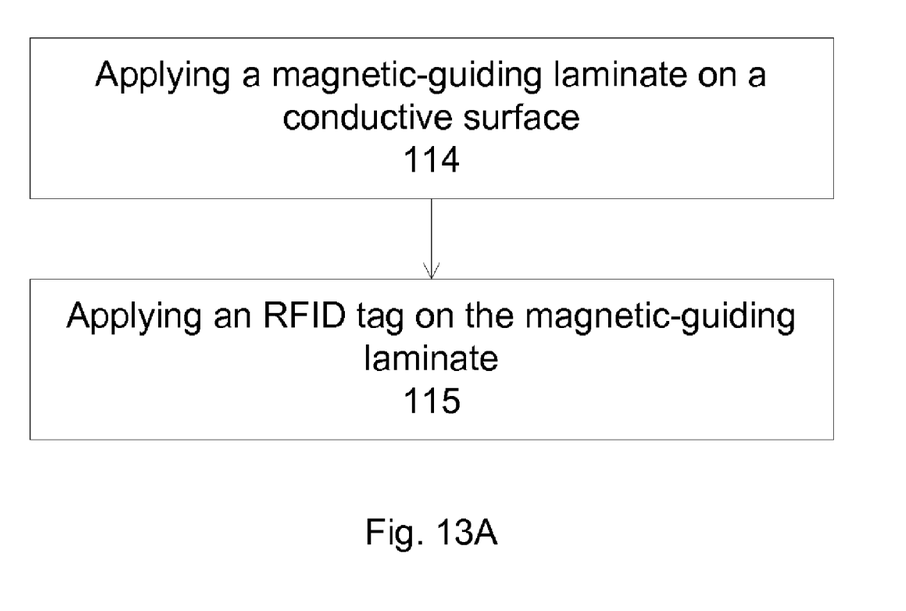
FIGS. 13A-13B illustrate methods to prepare an RFID system with improved signal reception.

FIG. 13A illustrates a method to prepare an RFID system with improved signal reception according to an embodiment of the present invention. In operation 114, a magnetic-guiding laminate is applied on a conductive surface of an object. The magnetic-guiding laminate can be a diamagnetic layer having permeability less than 1. The magnetic-guiding laminate can be a multilayer laminate, comprising at least two layers with different magnetic property. For example, the multilayer laminate can comprise a paramagnetic layer on a diamagnetic layer, or a lower permeability paramagnetic layer on a higher permeability paramagnetic layer. In operation 115, an RFID tag is applied on the magnetic-guiding laminate.

Figure 13B:
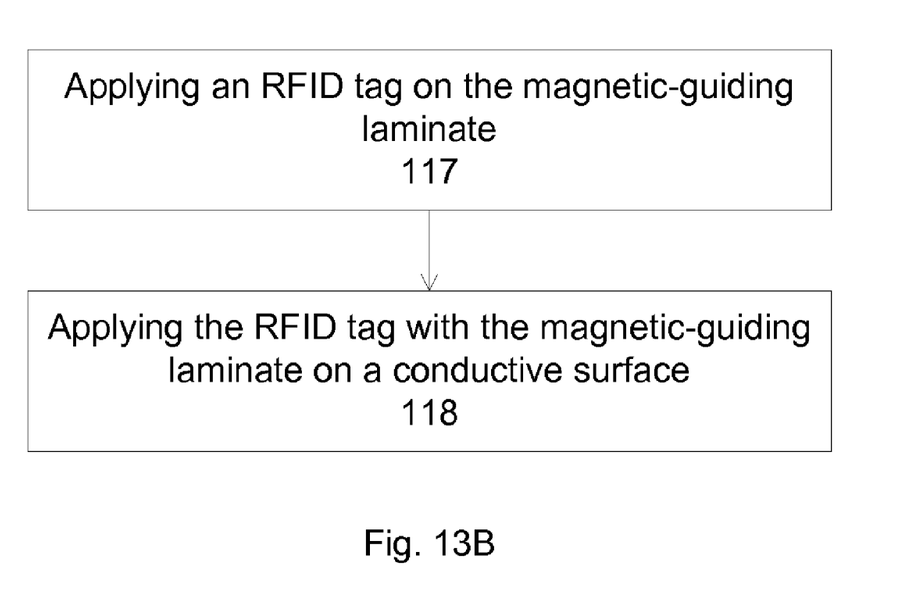

FIG. 13B illustrates another method to prepare an RFID system with improved signal reception according to an embodiment of the present invention. In operation 117, an RFID tag is applied on a magnetic-guiding laminate. In operation 118, RFID tag with the laminate is applied to a conductive surface of an object.

Additional layers can be used, on top, in between, and/or at bottom of the RFID system. The additional layers can be adhesive layers, insulating layers, encapsulating layers, or other magnetic layers.

In an embodiment, the magnetic layer can be formed by depositing, printing, coating, or laminating. For example, the magnetic layer can be deposited on the carrier substrate by vacuum deposition, by electroplating, or by electroless plating. The magnetic layer can be formed on the carrier substrate by a printing process, printing a layer or a pattern of magnetic material. Alternatively, the printing process can print a layer of support material, such as a plastic layer, together with printing embedded magnetic particles within the layer. The magnetic layer can be coated with a paste mixture comprising embedded magnetic particles, and can be applied, for example, by brush and coating tools.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A multilayer laminate wherein the multilayer laminate comprises at least two magnetic layers,
    wherein the two magnetic layers have different magnetic properties, and
    wherein the multilayer laminate improves signal reception of an antenna disposed on the multilayer laminate.

2. A multilayer laminate as in claim 1 wherein the multilayer laminate comprises a paramagnetic layer disposed on a diamagnetic layer.

3. A multilayer laminate as in claim 1 wherein the multilayer laminate comprises a first paramagnetic layer disposed on a second paramagnetic layer, wherein the first and second paramagnetic layers have different permeability values.

4. A multilayer laminate as in claim 1 wherein one of the magnetic layers is a part of a carrier substrate.

5. An antenna system comprising
    an antenna;
    a multilayer laminate disposed under the antenna, wherein the multilayer laminate comprises at least two magnetic layers,
    wherein the two magnetic layers have different magnetic properties, and
    wherein the multilayer laminate improves signal reception of the antenna.

6. An antenna system as in claim 5 wherein at least one magnetic layer comprises a diamagnetic layer.

7. An antenna system as in claim 5 wherein at least one magnetic layer comprises a layer material that repels magnetic field.

8. An antenna system as in claim 5 wherein the multilayer laminate comprises a first paramagnetic layer disposed on a second paramagnetic layer, wherein the first and second paramagnetic layers have different permeability values.

9. An RFID transponder electronic label comprising
    a carrier substrate;
    an RFID assembly comprising an RFID antenna and an RFID chip;
    a multilayer laminate disposed between the RFID antenna and the carrier substrate, wherein the multilayer laminate comprises at least two magnetic layers,
    wherein the two magnetic layers have different magnetic properties, and
    wherein the multilayer laminate improves signal reception of the antenna.

10. An RFID transponder electronic label as in claim 9 wherein the multilayer laminate comprises a paramagnetic layer disposed on a diamagnetic layer.

11. An RFID transponder electronic label as in claim 10 wherein the diamagnetic layer comprises gold, sulfur, lead, bismuth, or any combination thereof.

12. An RFID transponder electronic label as in claim 9 wherein the multilayer laminate comprises a first paramagnetic layer disposed on a second paramagnetic layer, wherein the first and second paramagnetic layers have different permeability values.

13. An RFID transponder electronic label as in claim 9 wherein the thickness of the multilayer laminate is less than 0.3 mm.

14. An RFID transponder electronic label as in claim 9 wherein at least one geometrical dimension of the two magnetic layers is different.

15. An RFID transponder electronic label as in claim 9 wherein at least one magnetic layer comprises a mixture of magnetic particles in at least one of an organic paste, an inorganic paste, and any paste mixture thereof.

16. An RFID transponder electronic label as in claim 9 wherein one of the magnetic layers is a part of a carrier substrate.

17. An RFID transponder electronic label as in claim 9 wherein at least one magnetic layer is structured with patterns on the surface.

18. An RFID transponder electronic label as in claim 9 wherein at least one magnetic layer is formed by applying a paste comprising magnetic particles.

19. An RFID transponder electronic label as in claim 9 wherein at least one magnetic layer is formed by one of a printing process, a vacuum technique, an electroplating process and an electroless plating process.

20. A method comprising
    forming a multilayer laminate on a substrate, wherein the multilayer laminate comprises at least two magnetic layers with different magnetic properties; and
    forming an antenna on the multilayer laminate,
    wherein the multilayer laminate improves signal reception of the antenna.

21. A method as in claim 20 wherein forming the multilayer laminate comprises
    forming a diamagnetic layer; and
    forming a paramagnetic layer on the diamagnetic layer.

22. A method as in claim 20 wherein forming the multilayer laminate comprises
    forming a first paramagnetic layer; and
    forming a second paramagnetic layer on the first paramagnetic layer,
    wherein the first and second paramagnetic layers have different permeability values.

23. A method as in claim 20 wherein at least one magnetic layer is formed by applying a paste comprising magnetic particles.

24. A method as in claim 20 wherein at least one magnetic layer is formed by one of a printing process, a vacuum technique, an electroplating process and an electroless plating process.

* * * * *